(12) United States Patent
Flajolet et al.

(10) Patent No.: US 11,991,940 B2
(45) Date of Patent: May 28, 2024

(54) METHOD FOR AUTONOMOUS DETECTION OF CROP LOCATION BASED ON TOOL DEPTH AND LOCATION

(71) Applicant: FarmWise Labs, Inc., San Francisco, CA (US)

(72) Inventors: Arthur Flajolet, San Francisco, CA (US); Eric Stahl-David, San Francisco, CA (US); Sébastien Boyer, San Francisco, CA (US); Thomas Palomares, San Francisco, CA (US)

(73) Assignee: FarmWise Labs, Inc., Santa Clara, CA (US)

( * ) Notice: Subject to any disclaimer, the term of this patent is extended or adjusted under 35 U.S.C. 154(b) by 857 days.

(21) Appl. No.: 17/074,332

(22) Filed: Oct. 19, 2020

(65) Prior Publication Data

US 2021/0034057 A1 Feb. 4, 2021

Related U.S. Application Data

(63) Continuation of application No. 16/539,390, filed on Aug. 13, 2019, now Pat. No. 10,845,810.
(Continued)

(51) Int. Cl.
*G06T 7/579* (2017.01)
*A01B 39/18* (2006.01)
(Continued)

(52) U.S. Cl.
CPC ............ *A01B 39/18* (2013.01); *A01B 69/004* (2013.01); *A01B 79/005* (2013.01);
(Continued)

(58) Field of Classification Search
CPC ..... A01B 39/18; A01B 69/004; A01B 79/005; A01B 63/1112; A01B 69/001;
(Continued)

(56) References Cited

U.S. PATENT DOCUMENTS 4,413,685 A 11/1983 Gremelspacher et al.
5,442,552 A 8/1995 Slaughter et al.
(Continued)

FOREIGN PATENT DOCUMENTS

JP 2013059296 A * 4/2013

OTHER PUBLICATIONS

Extended European Search Report European Application No. 19850650.3 dated Apr. 4, 2022, 7 pages.
(Continued)

*Primary Examiner* — Matthew C Bella
*Assistant Examiner* — Pardis Sohraby
(74) *Attorney, Agent, or Firm* — Jeffrey Schox; Diana Lin

(57) ABSTRACT

A method for detecting real lateral locations of target plants includes: recording an image of a ground area at a camera; detecting a target plant in the image; accessing a lateral pixel location of the target plant in the image; for each tool module in a set of tool modules arranged behind the camera and in contact with a plant bed: recording an extension distance of the tool module; and recording a lateral position of the tool module relative to the camera; estimating a depth profile of the plant bed proximal the target plant based on the extension distance and the lateral position of each tool module; estimating a lateral location of the target plant based on the lateral pixel location of the target plant and the depth profile of the plant bed surface proximal the target plant; and driving a tool module to a lateral position aligned with the lateral location of the target plant.

17 Claims, 4 Drawing Sheets

Related U.S. Application Data

(60) Provisional application No. 62/718,330, filed on Aug. 13, 2018.

(51) Int. Cl.
| | |
|---|---|
| *A01B 69/00* | (2006.01) |
| *A01B 79/00* | (2006.01) |
| *G05D 1/00* | (2006.01) |
| *G06V 10/44* | (2022.01) |
| *G06V 10/82* | (2022.01) |
| *G06V 20/10* | (2022.01) |
| *G06V 20/64* | (2022.01) |

(52) U.S. Cl.
CPC ......... *G05D 1/0094* (2013.01); *G05D 1/0219* (2013.01); *G05D 1/0246* (2013.01); *G06T 7/579* (2017.01); *G06V 10/454* (2022.01); *G06V 10/82* (2022.01); *G06V 20/10* (2022.01); *G06V 20/188* (2022.01); *G06V 20/64* (2022.01); *G06T 2207/10028* (2013.01)

(58) Field of Classification Search
CPC .. G05D 1/0094; G05D 1/0219; G05D 1/0246; G05D 2201/0201; G06T 7/579; G06T 2207/10028; G06V 10/454; G06V 10/82; G06V 20/10; G06V 20/188; G06V 20/64
USPC ........................................................ 382/104
See application file for complete search history.

(56) References Cited

U.S. PATENT DOCUMENTS

| | | | |
|---|---|---|---|
| 5,946,896 A | 9/1999 | Daniels | |
| 5,974,348 A | 10/1999 | Rocks | |
| 7,032,369 B1 | 4/2006 | Eaton et al. | |
| 9,119,388 B2 | 9/2015 | Jens | |
| 9,265,187 B2 | 2/2016 | Cavender-Bares et al. | |
| 9,288,938 B2 | 3/2016 | Cavender-Bares et al. | |
| 9,392,743 B2 | 7/2016 | Camacho-Cook et al. | |
| 9,717,171 B2 | 8/2017 | Redden et al. | |
| 10,231,376 B1 | 3/2019 | Stanhope et al. | |
| 10,255,670 B1 | 4/2019 | Wu et al. | |
| 10,455,755 B2 | 10/2019 | Stanhope | |
| 2003/0187560 A1 | 10/2003 | Keller et al. | |
| 2014/0168412 A1 | 6/2014 | Shulman et al. | |
| 2015/0075067 A1 | 3/2015 | Stowe et al. | |
| 2016/0157429 A1 | 6/2016 | Pitzer et al. | |
| 2017/0049044 A1 | 2/2017 | Stoller et al. | |
| 2017/0206415 A1 | 7/2017 | Redden | |
| 2017/0223947 A1 | 8/2017 | Gall et al. | |
| 2017/0345398 A1 | 11/2017 | Fuchs et al. | |
| 2018/0114305 A1 | 4/2018 | Strnad et al. | |
| 2018/0128933 A1 | 5/2018 | Koch et al. | |
| 2018/0139947 A1 | 5/2018 | Albert et al. | |
| 2018/0184581 A1 | 7/2018 | Morgan et al. | |
| 2018/0238823 A1 | 8/2018 | Puhalla et al. | |
| 2018/0279556 A1 | 10/2018 | Briquet-Kerestedjian et al. | |
| 2019/0059206 A1 | 2/2019 | Stanhope et al. | |
| 2019/0064363 A1* | 2/2019 | Redden | G06V 10/751 |
| 2019/0150357 A1* | 5/2019 | Wu | H04N 7/188 |
| 2019/0239502 A1 | 8/2019 | Palomares et al. | |
| 2019/0285422 A1 | 9/2019 | Opitsch et al. | |
| 2019/0311198 A1 | 10/2019 | Zemenchik | |
| 2020/0000081 A1 | 1/2020 | Palomares et al. | |
| 2020/0015408 A1 | 1/2020 | Armstead | |
| 2020/0019777 A1* | 1/2020 | Gurzoni, Jr. | G06V 10/803 |
| 2020/0029490 A1 | 1/2020 | Bertucci et al. | |
| 2020/0045953 A1* | 2/2020 | Serrat | A01M 7/0089 |
| 2020/0049635 A1 | 2/2020 | Couture et al. | |
| 2020/0084965 A1 | 3/2020 | Neitemeier et al. | |
| 2020/0107490 A1 | 4/2020 | Zemenchik | |
| 2020/0296875 A1* | 9/2020 | Calleija | A01M 21/04 |

OTHER PUBLICATIONS

Non-final Office Action from U.S. Appl. No. 16/539,390 dated Apr. 16, 2020, 11 pages.

* cited by examiner

METHOD FOR AUTONOMOUS DETECTION OF CROP LOCATION BASED ON TOOL DEPTH AND LOCATION

CROSS-REFERENCE TO RELATED APPLICATIONS

This application is a continuation application of U.S. patent application Ser. No. 16/539,390, filed on 13 Aug. 2019, which claims the benefit of U.S. Provisional Application No. 62/718,330, filed on 13 Aug. 2018, both of which are incorporated in their entirety by this reference.

TECHNICAL FIELD

This invention relates generally to the field of agricultural implements and more specifically to a new and useful method for autonomously detecting crops in an agricultural field while performing agricultural activities in the field of agricultural implements.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
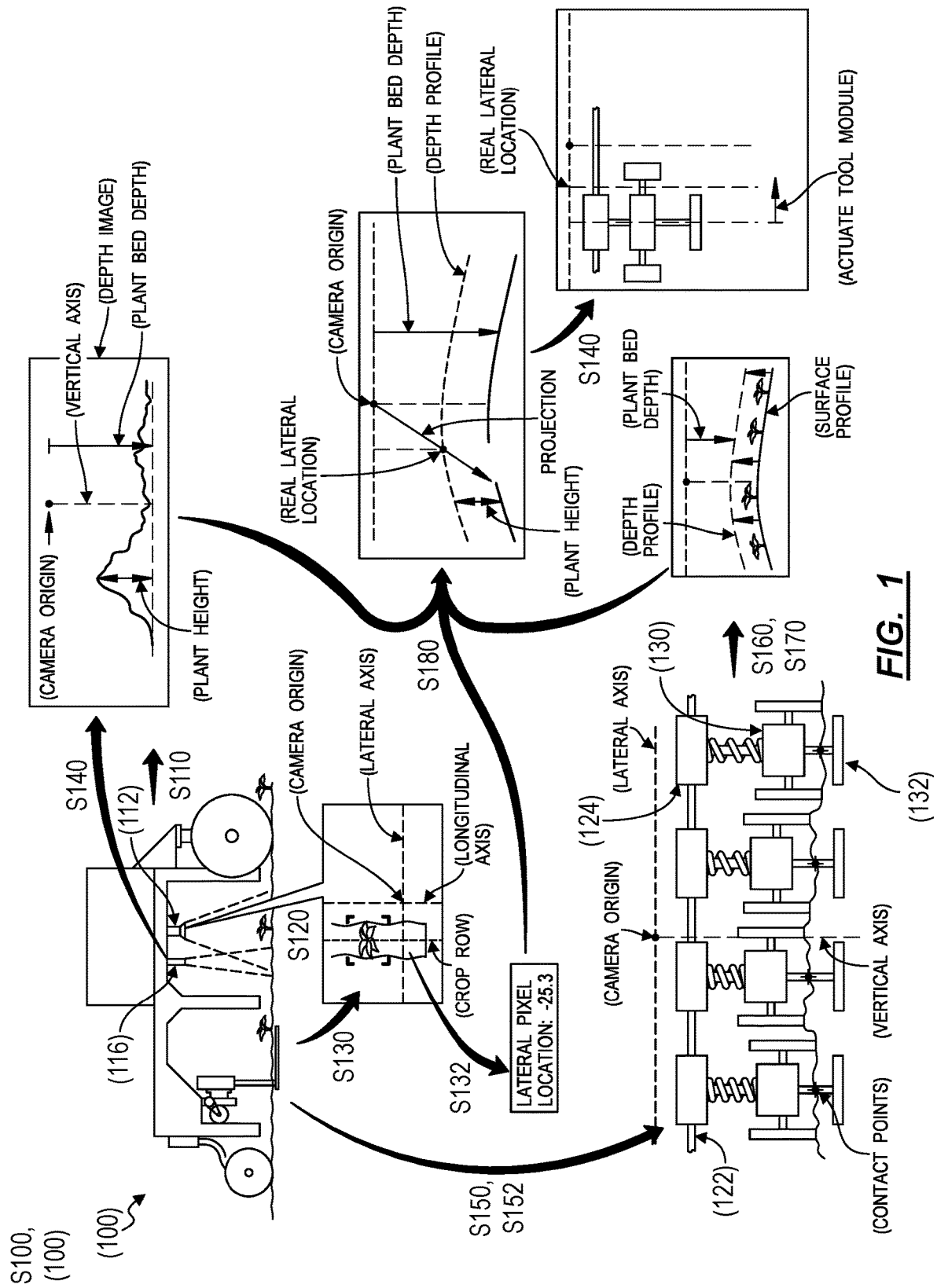
FIG. 1 is a flowchart representation of a first method.

As shown in FIG. 1, a method S100 for detecting real lateral locations of target plants relative to an autonomous machine 100 can include, at the autonomous machine 100: autonomously navigating within an agricultural field in Block S110; recording a first image of a ground area at a ground-facing camera 112 arranged proximal a front of the autonomous machine 100 in Block S120; detecting a first target plant in the first image in Block S130; accessing a lateral pixel location of the first target plant in the first image in Block S132; and, at a depth sensor 116 proximal the front of the autonomous machine 100 and defining a field of view encompassing a subregion of the ground area, estimating a depth of the subregion of the ground area in Block S140. The method S100 also includes, for each tool module in a set of tool modules arranged behind the ground-facing camera and in contact with a plant bed surface: recording an extension distance of the tool module 130 in Block S150; and recording a lateral position of the tool module 130 relative to the ground-facing camera 112 in Block S152. The method S100 further includes: estimating a surface profile of the plant bed surface based on the extension distance of each tool module 130 in the set of tool modules 130 and the lateral position of each tool module 130 in the set of tool modules 130 in Block S160; estimating a depth profile based on the surface profile and the depth of the subregion of the ground area in Block S110; estimating a real lateral location of the first target plant relative to the autonomous machine 100 based on the lateral pixel location of the first target plant and the depth profile of the plant bed surface proximal the first target plant in Block S180; and driving a first tool module 130 in the set of tool modules 130 to a lateral position laterally aligned with the real lateral location of the first target plant in Block S190.

One variation of the method S100 can include, at the autonomous machine 100: at a first time, recording a first image of a first ground area at a ground-facing camera 112 arranged proximal a front of the autonomous machine 100 in Block S120; detecting a first target plant in the first image in Block S130; and accessing a lateral pixel location of the first target plant in the first image in Block S132. This variation of the method S100 also includes, at a second time, for each tool module in a set of tool modules arranged behind the ground-facing camera and in contact with a plant bed surface: recording a first extension distance of the tool module 130 in Block S150; and recording a first lateral position of the tool module 130 relative to the ground-facing camera 112 in Block S152. This variation of the method S100 further includes estimating a first depth profile of the plant bed surface proximal the first target plant based on the first extension distance of each tool module 130 in the set of tool modules 130 and the first lateral position of each tool module 130 in the set of tool modules 130 in Block S172; estimating a real lateral location of the first target plant relative to the autonomous machine 100 based on the lateral pixel location of the first target plant and the first depth profile of the plant bed surface proximal the first target plant in Block S180; and driving a first tool module 130 in the set of tool modules 130 to a lateral position laterally aligned with the real lateral location of the first target plant in Block S190.

Another variation of the method S100 includes, at the autonomous machine 100: autonomously navigating within an agricultural field in Block S110; at a first time, recording a first image of a first ground area at a ground-facing camera 112 arranged proximal a front of the autonomous machine 100 in Block S120; detecting a first target plant in the first image in Block S130; and accessing a lateral pixel location of the first target plant in the first image in Block S132. This variation of the method S100 also includes, at a second time, for each tool module in a set of tool modules mounted to a toolbar arranged behind ground-facing camera and in contact with a plant bed surface: recording an extension distance of the tool module 130 relative to the toolbar in Block S150; and recording a lateral position of the tool module 130 relative to the toolbar in Block S152. This variation of the method S100 further includes: estimating a depth profile of the plant bed surface proximal the target plant based on the extension distance of each tool module 130 in the set of tool modules 130, the lateral position of each tool module 130 in the set of tool modules 130, and an inclination of the toolbar in Block S174; estimating a real lateral location of the first target plant relative to the ground-facing camera 112 based on the lateral pixel location of the first target plant and the depth profile in Block S180; and driving a first tool module 130 in the set of tool modules 130 along the toolbar to a lateral position laterally aligned with the real lateral location of the first target plant in Block S190.

2. Applications

Generally, the method S100 can be executed by an autonomous farm implement (hereinafter an "autonomous machine 100") to automatically: navigate along plant beds including rows of crops in an agricultural field; to record images of the plant bed using a ground-facing camera 112; to detect target plants in the recorded images; to extract pixel locations of those target plants; to estimate a surface profile of the plant bed surface by utilizing the vertical position (or extension) of tool modules 130 located behind the ground-facing camera 112, wherein each tool module 130 is contacting the plant bed surface (e.g. rolling along the plant bed); to calculate the real lateral location of a target plant based on the estimated surface profile; and to laterally actuate the tool module 130 along the toolbar to intercept the real lateral location of the target plant in response to longitudinal motion of the autonomous machine 100.

In particular, the autonomous machine 100 can execute Blocks of the method S100 to accurately calculate the location of a target plant on the plant bed surface in three-dimensional space relative to the autonomous machine 100 without needing additional depth sensor 116s (e.g. LIDAR) proximal the ground-facing camera 112 or an additional camera for binocular vision to obtain depth information. The autonomous machine 100 utilizes sensors on the tool modules 130 that perform agricultural functions to record depth information regarding the plant bed surface. Thus, the autonomous machine 100 can process images output by a ground-facing camera 112 in combination with the depth information according to the method S100 in order to achieve high lateral locational accuracy for detected target plants passed by the autonomous machine 100 during operation. The autonomous machine 100 can then precisely perform agricultural functions such as weeding, watering, and fertilizing on the target plant via the laterally mobile tool modules 130 installed on the autonomous machine 100 that can align with the calculated lateral location of the target plant.

In one variation of the method S100, the autonomous machine 100 can also include a depth sensor 116 (e.g., LIDAR) proximal the front of the autonomous machine 100 and can detect the depth of a subsection of the plant bed surface. The autonomous machine 100 can then estimate the shape of the surface (as a surface profile) according to depth information obtained from the set of tool modules 130. Therefore, the autonomous machine 100 can obtain an accurate depth profile across the entire field of view of the ground-facing camera 112 while detecting the depth of only a small subsection of the ground area within the field of view of the ground-facing camera 112, thereby reducing the overall cost of the autonomous machine due to a reduction in the number of depth sensor 116s needed to map the depth of the plant bed surface. Furthermore, the autonomous machine 100 can also detect the height of plants in the agricultural field (e.g., an average height) in order to improve lateral and longitudinal location estimates for each target plant.

The autonomous machine 100 can include modular tool modules 130 that may be exchanged by the user to alternatively perform weeding, watering, seeding, and/or other agricultural functions. The autonomous machine 100 accomplishes these agricultural functions by drawing the tool modules 130 along a plant bed, which may include two to six rows of plants across the width of the autonomous machine 100. Additionally, the tool modules 130 can be mounted to a laterally-oriented (i.e. perpendicular to the longitudinal axis of the autonomous machine 100 or the forward direction of the autonomous machine 100) toolbar. The autonomous machine 100 can individually actuate each of the tool modules 130 along the toolbar, such that the tool modules 130 laterally align with target plants that are passing under the autonomous machine 100 as the autonomous machine 100 navigates through an agricultural field. Thus, the independently-movable tool modules 130 can intercept target plants (or another identifiable location on the plant bed) and more accurately perform weeding, watering, or fertilizing operations.

The autonomous machine 100 also includes a ground-facing camera 112, mounted forward of the toolbar and tool modules 130, that can record images of the plant bed. The autonomous machine 100 can then implement computer vision techniques to analyze the plant bed and detect target plants such that the tool modules 130 can effectively weed, water, fertilize, or otherwise operate around the target plant. Once the autonomous machine 100 detects a target plant in the image, the autonomous machine 100 can extract a pixel location of the target plant in the image (e.g. a centroid of the target plant or an approximate location of the stem of a target plant). The autonomous machine 100 then calculates an incident projection in three-dimensional space relative to the ground-facing camera 112 corresponding to the extracted pixel.

Hereinafter, the term "projection" of a particular pixel represents the azimuthal and radial angles of the center of the field of view of the particular pixel. For example, after detecting the center of a plant in an image recorded by the ground-facing camera 112, the autonomous machine 100 can query a mapping or parametric model for the projection of a particular pixel corresponding to the center of the plant. The mapping or parametric model can, therefore, output radial and azimuthal angles of a ray extending from the camera through the center of the plant (e.g. relative to the camera or another reference point on the autonomous machine 100). Alternatively, the autonomous machine 100 can represent the projection mathematically in order to describe the heading and position of the projection in three-dimensional space relative to the autonomous machine 100, such as in the form of a set of projective coordinates, a linear function, or a vector, etc.

To estimate a location of the target plant along the projection corresponding to the pixel location of the target plant, the autonomous machine 100 records extension distances provided by extension sensors (e.g. linear encoders or rotational encoders) that individually measure the extension distance of the tool modules 130 from the toolbar. The tool modules 130 are vertically mobile relative to the toolbar via a suspension mechanism so that the tool modules 130 maintain contact with the surface of the plant bed (e.g. with wheels). The autonomous machine 100 records the extension distance for each tool module 130, which corresponds with the depth of the plant bed surface at the lateral position of the tool module 130. Therefore, by simultaneously recording the lateral position of each tool module 130 and the extension distance of each tool module 130, the autonomous machine 100 obtains several data points indicating the depth of the surface of the plant bed relative to the toolbar of the autonomous machine 100. The autonomous machine 100 can perform additional processing, such as interpolation and regression on the extension distances to estimate a surface profile of the plant bed surface at the position of the toolbar.

The autonomous machine 100 can be preprogrammed with calibrated geometric information relating the exact position and orientation of the toolbar to the exact position and orientation of the ground-facing camera 112. In implementations where the toolbar is mobile relative to the chassis 104 of the autonomous machine 100, calibration can be performed at multiple orientations of the toolbar. Thus, the autonomous machine 100 can estimate a depth of the plant bed surface along the projection of the pixel corresponding to the target plant by waiting until the longitudinal location of the target plant is sufficiently close to the longitudinal location of the toolbar. When the target plant is close enough, the autonomous machine 100 can estimate the current surface profile based on the extension distances of tool modules 130 and the position of the toolbar to calculate an intersection between the projection of the target plant and the surface profile and estimate an accurate lateral location of the target plant.

In one implementation, the autonomous machine 100 can actuate the toolbar to adjust the height of the toolbar and the tilt of the toolbar to better position the tool modules 130 based on the surface profile of the plant bed. For example, each tool module 130 has a maximum and a minimum extension distance defining an extensible range of the tool modules 130. Thus, the autonomous machine 100 can adjust the tilt of the toolbar to substantially match an average tilt of the surface profile of the plant bed such that the variation between the extension distance of each toolbar is minimized. Additionally, the autonomous machine 100 can actuate the toolbar to adjust the height of the toolbar, such that each tool module 130 is operating at approximately the midpoint of each tool module's vertical extensible range. Furthermore, the autonomous machine 100 can adjust the inclination of the toolbar in order to compensate for plant bed tilt, while maintaining normal function for the tool modules 130.

The autonomous machine 100 is described below as including weeding modules and executing the method S100 to de-weed an agricultural field. However, the autonomous machine 100 can implement similar methods and techniques to prepare and then trigger tool modules 130 of other types—such as seeding, watering, fertilizing, harvesting, and pesticide modules—to apply water or fertilizer to target plants and/or apply pesticides around these target plants, etc.

3. Autonomous Machine

Figure 2:
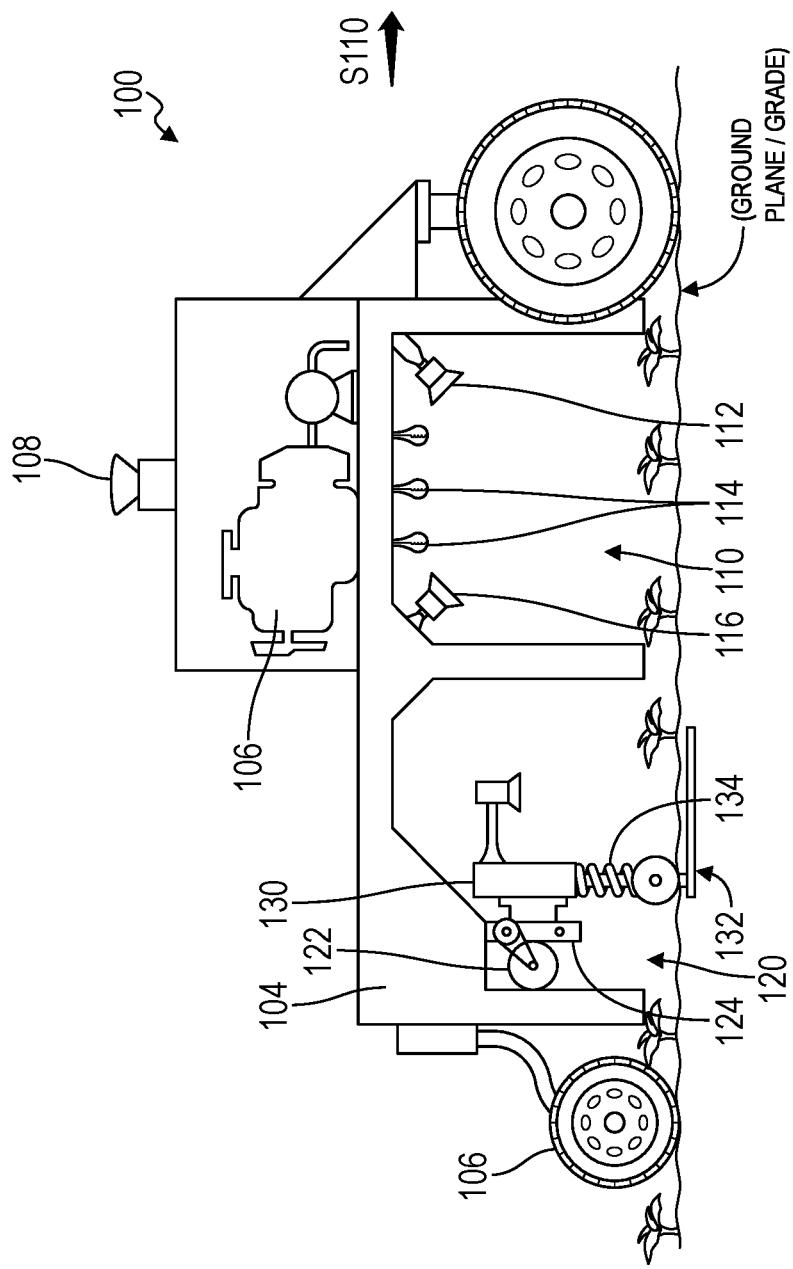
FIG. 2 is a schematic representation of an autonomous machine.

As shown in FIG. 2, the autonomous machine 100 is configured to autonomously navigate through an agricultural field. The autonomous machine 100 can thus define a wheeled or tracked vehicle and can include a chassis 104 and a drive unit 106 configured to propel the autonomous machine 100 forward. The autonomous machine 100 can also include: geospatial position sensors 108 (e.g., GPS) configured to output the autonomous machine 100's location in space; inertial measurement units configured to output values representing the autonomous machine 100's trajectory; and/or outwardly facing color and/or depth sensor 116s (e.g., color cameras, LIDAR sensors, and/or structured light cameras, etc.) configured to output images from which the autonomous machine 100 can detect nearby obstacles, localize itself within a scene, and/or contextualize a nearby scene; etc. The autonomous machine 100 can also include an onboard navigation system configured to collect data from the foregoing sensors, to elect next actions, and to adjust positions of various actuators within the autonomous machine 100 to execute these next actions.

3.1 Light Module

The autonomous machine 100 can also include a light module 110 arranged proximal the front of the autonomous machine 100 in order to prevent external light from illuminating the plant bed surface thereby improving classification and location of target plants. The light module 110 can define an enclosed volume with a downward-facing opening spanning one or more crop rows. The light module 110 can also include controllable lighting elements 114 configured to repeatably illuminate a ground area directly under the opening of the light module 110.

3.2 Tool Housing

The autonomous machine 100 can further include a tool housing 120 arranged behind the light module 110 and configured to house a toolbar and/or one or more tool modules 130 mounted to the toolbar, such as described below.

In one implementation, the tool housing 120 includes a toolbar configured to transiently receive one or more tool modules 130 mounted onto the toolbar. The toolbar is positioned laterally relative to the autonomous machine 100, or perpendicular to the direction of forward motion (i.e. longitudinal direction) of the autonomous machine 100. The toolbar defines a long extrusion of material, such as high strength steel or aluminum, configured to physically support one or more tool modules 130 mounted to the toolbar without significant deformation. Additionally, the toolbar can define a cross section configured to fit within an actuating slot on each tool module 130. Therefore, the tool modules 130 can actuate laterally along the toolbar. The toolbar can span the entire width of a plant bed (which may include one or more plant rows) over which the autonomous machine 100 navigates, such that tool modules 130 mounted on the toolbar can laterally align an end effector of a tool module 130 with successive plants in a row of crops over which the autonomous machine 100 passes during operation. For example, the tool housing 120 of the autonomous machine 100 can include four (or six) tool modules 130 mounted to the toolbar. To autonomously weed a field of crops, each tool module 130 in the autonomous machine 100 can be a weeding module. As the autonomous machine 100 passes over a field of crops, these tool modules 130 can be independently-controlled to laterally align with successive target plants in corresponding rows of crops as these weeding modules selectively upset weeds while rendering target plants (i.e., crops) substantially undisturbed.

At another time, to water these crops, a user may replace the weeding modules with watering modules connected to a common water reservoir installed on the autonomous machine 100. As the autonomous machine 100 navigates along rows of crops, the autonomous machine 100 can: independently control these tool modules 130 to laterally align with target plants in its corresponding crop row; and selectively trigger each watering module to dispense water onto target plants in their corresponding crop rows.

Similarly, to fertilize these crops, a user may replace the tool modules 130 with fertilizing modules connected to a common fertilizer reservoir installed on the autonomous machine 100. As the autonomous machine 100 navigates along rows of crops, the autonomous machine 100 can: independently control the fertilizing modules to laterally align each fertilizing module with a target plant in its corresponding crop row; and selectively trigger each fertilizing module to dispense fertilizer onto these target plants.

The autonomous machine 100 can also include toolbar actuators coupling the toolbar to the tool housing 120. In one implementation, the toolbar actuators are coupled to each end of the toolbar, such that the autonomous machine 100 can raise or lower the toolbar. Additionally or alternatively, the toolbar actuators can be actuated independently (e.g. the autonomous machine 100 can actuate a left toolbar actuator upward while actuating a right toolbar actuator downward or by keeping one toolbar actuator stationary while actuating the second toolbar actuator), thereby imparting a tilt to the toolbar. As such, a toolbar actuator can include a triangulated suspension arm at an end of the toolbar and a linear actuator also coupled to the end of the toolbar, such that the toolbar can actuate upward and downward while also changing the inclination of the toolbar. The autonomous machine 100 can include self-actuating tool modules 130 that can adjust their orientation relative to the toolbar to maintain an upright orientation relative to the plant bed when the toolbar is inclined.

The autonomous machine 100 can utilize closed-loop controls to actuate the toolbar. Thus, the toolbar can include linear or rotational encoders configured to measure the real position (i.e. height and tilt) of the toolbar. However, the encoders serve a dual function in that, by measuring the real position of the toolbar, they provide the autonomous machine 100 with information that, in combination with extension distance data from encoders on the tool modules 130 can be utilized to estimate a surface profile of the plant bed.

Alternatively, the tool modules 130 are not mounted directly to the toolbar and instead the tool housing 120 includes a tool receptacle 124: attached to the toolbar; configured to transiently receive one of various tool modules 130; and including a tool positioner 122 configured to shift the tool receptacle 124 laterally within the tool housing 120 in order to laterally align an end effector of a tool module 130—loaded into the tool receptacle 124—with successive plants in a row of crops over which the autonomous machine 100 passes during operation. To autonomously weed a field of crops, each tool receptacle 124 in the autonomous machine 100 can be loaded with a weeding module. As the autonomous machine 100 passes over a field of crops, tool positioners 122 in these tool receptacles 124 can be independently-controlled to laterally align their weeding modules to successive target plants in corresponding rows of crops as these weeding modules selectively upset weeds while rendering target plants (i.e., crops) substantially undisturbed.

At another time, to water these crops, the tool receptacles 124 can be loaded with watering tools connected to a common water reservoir installed on the autonomous machine 100. As the autonomous machine 100 navigates along rows of crops, the autonomous machine 100 can: independently control tool positioners 122 in these tool receptacles 124 to laterally align each watering tool to target plants in its corresponding crop row; and selectively trigger each watering tool to dispense water onto target plants in their corresponding crop rows.

Similarly, to fertilize these crops, the tool receptacles 124 can be loaded with fertilizing tools connected to a common fertilizer reservoir installed on the autonomous machine 100. As the autonomous machine 100 navigates along rows of crops, the autonomous machine 100 can: independently control tool positioners 122 in these tool receptacles 124 to laterally align each fertilizing tool to target plants in its corresponding crop row; and selectively trigger each fertilizing tool to dispense fertilizing onto these target plants.

Tool receptacles 124 in the tool housing 120 can be similarly loaded with: fertilizing tools; pesticide/herbicide tools; thinning or culling tools; seeding tools; and/or harvesting tools; etc.

3.3 Cameras

The autonomous machine 100 can also include various cameras or other optical sensors arranged inside the light module 110 and inside the tool housing 120 and configured to record images of the plant bed passing under the light module 110 and the tool housing 120 as the autonomous machine 100 autonomously navigates along crop rows within an agricultural field.

In one implementation, the autonomous machine 100 includes one or more ground-facing camera 112S (e.g., a high-resolution, high-speed RGB or CMYK camera or multi-spectral imager, and/or LIDAR) arranged in the light module 110, defining a field of view spanning all or a portion of the opening of the light module 110, and configured to record images of areas of the plant bed entering the light module no from the front of the autonomous machine 100 (i.e., areas of the plant bed that the autonomous machine 100 is navigating over). The autonomous machine 100 can then analyze these images to detect and distinguish crops (or "target plants") from weeds, to calculate locations of target plants with a relatively high degree of accuracy and repeatability in three-dimensional space and relative to the orientation and position of the ground-facing camera 112, and/or to extract qualities of these target plants (e.g., pest presence, fertilizer burns, nutrient or water deficiency, etc.).

3.4 Depth Sensor 116

In one variation, the autonomous machine 100 can include a ground-facing depth sensor 116 such as a LIDAR, time-of-flight camera, or any other depth sensing device. The autonomous machine 100 can include the depth sensor 116 mounted within the light box of the autonomous machine 100 proximal the ground-facing camera 112. Therefore, the depth sensor 116 can define a field of view within the field of view of the ground-facing camera 112. However, in one implementation, the depth sensor 116 can define a field of view covering a subsection of the ground area encompassed by the field of view of the ground-facing camera 112 despite being positioned proximal to the ground-facing camera 112 (e.g., due to a narrower field of view of the depth sensor 116).

However, the depth sensor 116 can be positioned at any location within the light box of the autonomous machine 100.

4. Tool Modules

As described above, the autonomous machine 100 can include one or more tool modules 130 mounted to the toolbar and configured to perform a particular agricultural function, such as weeding, watering, or fertilizing. In one implementation, each type of tool module 130 shares a similar structure including: an actuating slot assembly configured to clamp onto the toolbar and to shift laterally relative the toolbar, a pivot coupled to the actuating slot assembly, an end effector to perform the agricultural function of the tool module 130 (e.g. a weeding blade system, water or fertilizer dispensing system, etc.), and a suspension system 134, which suspends the end effector at a consistent height above or below the adjacent plant bed surface.

In one implementation, the actuating slot assembly of the tool module 130 can include wheels (which can be grooved or ratcheted to prevent slippage along the toolbar) configured to rotate as the tool module 130 proceeds laterally along the toolbar. The tool module 130 can include a second set of wheels below the toolbar to prevent dislodgement of the tool module 130 from the toolbar by effectively clamping onto the toolbar from above and below the toolbar. Additionally or alternatively, the wheels of the tool module 130 can fit into corresponding grooves on the toolbar to prevent the wheels from sliding off the toolbar. The actuating slot assembly of the tool module 130 can also include an encoder, such as an optical linear encoder, which can directly determine the lateral location of the tool module 130 on the toolbar. Additionally, the actuating slot assembly can be configured to open and close the actuating slot, such that the tool module 130 can be mounted and removed from the toolbar.

Alternatively, the tool modules 130 can be rigidly mounted to the toolbar via a clamp or other mechanism and can include an integrated actuator configured to shift the tool module 130 laterally relative to the clamp.

In one implementation, the actuating slot assembly or other actuating mechanism is coupled to the end effector and passive suspension system 134 via a pivot point. Thus, the tool module 130 can maintain its orientation despite changes in tilt of the toolbar. For example, if the toolbar is inclined at two degrees, the pivot point of each tool module 130 mounted to the toolbar can counteract that tilt by rotating two degrees in the opposite direction, thereby maintaining a vertical orientation. In one implementation, the pivot point is passive and rotation about the pivot point is caused by the force of gravity on the end effector and suspension system 134. Alternatively, the end effector and suspension system 134 can rotate about the pivot point via hydraulic, pneumatic, or electromechanical actuation.

The tool module 130 includes a suspension system 134, which suspends the end effector of the tool module 130 at a specific height above or below the surface of the plant bed. The suspension system 134 can include a wheel or sliding apparatus (e.g. a ski) configured to contact and follow the adjacent plant bed surface, such that the end effector—coupled to the suspension system 134—remains at a constant depth relative the plant bed surface as the autonomous machine 100 navigates through the agricultural field. In one example, the suspension system 134 includes two wheels arranged on either side of the end effector and sufficiently offset from the end effector, such that the autonomous machine 100 can align the end effector with target plants without running over the target plant with the one or more wheels of the tool module 130. In one implementation, the suspension system 134 is passive and includes a spring and damper system which extends under the sprung weight of the tool module 130 not supported by the toolbar to which the tool module 130 is mounted (e.g. the end effector, suspension components, and wheels). The sprung weight of the tool module 130 causes the suspension system 134 to extend toward the plant bed until the wheel of the tool module 130 contacts the plant bed and prevents further extension of the suspension system 134. Alternatively, the suspension system 134 can be hydraulically, pneumatically, or electromechanically extendable. For example, the suspension system 134 can include a hydraulic actuator which extends the end effector and wheels of the tool module 130 toward the plant bed until the wheels come into contact with the plant bed surface. In one implementation, the suspension system 134 includes a pneumatic piston and spring system wherein the autonomous machine 100 can adjust the force with which the end effectors of the tool modules 130 are pressed into the ground, thereby enabling precise adjustment of end effector depth and/or pressured exerted upon the plant bed.

Furthermore, the suspension system 134 can include an encoder to determine the extension distance of the suspension system 134 relative to the toolbar. For example, the encoder can indicate that the suspension system 134 is extended ten centimeters past its home position. Thus, the autonomous machine 100 can record tool position data including: the height and tilt of the toolbar via encoders in the toolbar actuators; and, for each tool module 130, the lateral position via the actuating slot encoders and the extension distance of the suspension system 134. The autonomous machine 100 can then use the tool position data in combination with images from the ground-facing camera 112 to accurately locate target plants on the plant bed surface, as discussed below.

However, the tool modules 130 can record extension distances from the toolbar to the plant bed using any other device, for example cameras, infrared or other proximity sensors, etc. mounted to each tool module 130.

4.1 Weeding Module

In one variation, the autonomous machine 100 includes weeding modules mounted on the toolbar. In one implementation, the weeding module can include a pair of blades 132 and a blade actuator configured to transition the blades 132 between open and closed positions. In this implementation, the blades 132: can define curved, cantilevered sections extending from driveshafts suspended from the toolbar; and submerged in topsoil, such as configured to run 0-60 millimeters below the plant bed surface while the autonomous machine 100 traverses an agricultural field in order to dislodge weeds from topsoil. The blades 132 can also be geared or otherwise driven together by the blade actuator—such as an electromagnetic rotary motor or a pneumatic linear actuator—such that the blades 132 open and close together.

In the closed position by default, tips of blades 132 can come into contact or nearly into contact such that the blades 132 form a continuous barricade across the width of the weeding module; the blades 132 in the closed position can thus displace topsoil and tear weeds out of the topsoil across the full lateral span of the blades 132 in the closed position. In this implementation, the pair of blades 132 can also be vertically offset relative to one another, thereby enabling the tips of the blades 132 to overlap to ensure a continuous barricade across the width of the weeding module in the closed position.

However, when opened by the blade actuator, tips of the blades 132 spread apart, thereby forming an open region between the tips of the blades 132. The blade actuator can therefore transition the blades 132 to the open position in order to form a gap between the blades 132: sufficient to fully clear the stalk of a target plant passing under the weeding module; sufficient to minimally disrupt topsoil around the target plant; but sufficiently closed to dislodge other non-target plants (e.g., weeds) immediately adjacent the target plant from the topsoil as the autonomous machine 100 autonomously navigates past the target plant.

In this implementation, in the open position, the blade actuator can open the blades 132 by a distance matched to a type and/or growth stage of crops in the field. For example, the target open distance between the blades 132 in the open position can be set manually by an operator prior to dispatching the autonomous machine 100 to weed the agricultural field. In this example, the operator can select the target open distance between the tips of the primary blade in the open position from a dropdown menu, such as: 20 mm for lettuce at two weeks from seeding; 30 mm for lettuce at three weeks from seeding; 40 mm for lettuce at four weeks from seeding; and 50 mm spread for lettuce after five weeks from seeding and until harvest. Alternatively, to avoid disrupting a small target plant with shallow roots but to improve weeding accuracy for more mature plants with deeper root structures, the operator can select the target open distance between the tips of the primary blade in the open position of: 50 mm for lettuce at two weeks from seeding; 40 mm for lettuce at three weeks from seeding; 30 mm for lettuce at four weeks from seeding; and 20 mm spread for lettuce after five weeks from seeding and until harvest. Alternatively, the autonomous machine 100 or affiliated support infrastructure can automatically select these distances based on the size of each plant, as estimated by the ground-facing camera 112. The blade actuator can then implement these setting during a next weeding operation at the field, as described below.

In particular, the blade actuator can be configured to retain the blades 132 in the closed position by default such that the blades 132 displace topsoil and tear weeds out of the topsoil across the full lateral span of the blades 132 as the autonomous machine 100 navigates along a crop row. However, in this example, upon nearing a target plant the autonomous machine 100 can trigger the blade actuator to open the blades 132 by the target open distance to permit the target plant to pass through the weeding module substantially undisturbed; once the target plant passes through the opening in the blades 132, the autonomous machine 100 can trigger the blade actuator to return to the closed position.

5. Operation

When dispatched to an agricultural field to perform a weeding operation, the autonomous machine 100 can autonomously navigate along crop rows in the agricultural field to detect and track target plants and to selectively actuate the weeding modules to dislodge plants other than target plants from the topsoil.

In particular, the method S100 is described below as executed by the autonomous machine 100 when loaded with a weeding module. For the autonomous machine 100 that includes multiple weeding modules, the autonomous machine 100 can execute multiple instances of Blocks of the method S100 simultaneously in order: to detect target plants in multiple discrete crop rows; to independently reposition these weeding modules into lateral alignment with target plants in their corresponding crop rows; and to selectively trigger their blade actuators to open and close in order to upset weeds while leaving target plants in these rows substantially undisturbed. Additionally, the autonomous machine 100 can perform the method S100 while performing other agricultural functions and while loaded with other tool modules 130. However, the method S100 is described with reference to weeding for ease of description.

5.1 Navigation

In one implementation, the autonomous machine 100: includes a set of geospatial position sensors 108 (e.g., a GPS sensors); and tracks its absolute position and orientation within a geospatial coordinate system based on outputs of these geospatial position sensors 108. In preparation for a weeding operation within an agricultural field, the perimeter or vertices of the agricultural field can be defined within the geospatial coordinate system and then loaded onto the autonomous machine 100. The longitudinal direction and lateral offset of crop rows in this agricultural field, start and stop locations (e.g., within the geospatial coordinate system), a target ground speed, and other relevant data can be similarly loaded onto the autonomous machine 100.

Once the autonomous machine 100 is dispatched to this agricultural field and once a weeding cycle by the autonomous machine 100 is subsequently initiated by an operator (e.g., locally or remotely), the autonomous machine 100 can, in Block S110: navigate to the specified start location (e.g., around rather than through the georeferenced boundary of the agricultural field); orient itself into alignment with the longitudinal direction of a first set of crop rows at the start location; and accelerate to the target ground speed parallel to the first set of crop rows. While traversing the first set of crops rows in a plant bed, the autonomous machine 100 can: record and process images recorded by the ground-facing camera 112 to detect plants entering the light module no from the front of the autonomous machine 100; distinguish target plants from weeds and other ground features, as described below; and interpolate crop rows between sequential target plants in this first set of crop rows. The autonomous machine 100 can then implement closed-loop controls to steer left or steer right in order to maintain the first set of crop rows underneath the autonomous machine 100 and within range of the tool modules 130 of the autonomous machine 100. The autonomous machine 100 can additionally or alternatively detect crop rows through images recorded by outwardly-facing cameras on the front of the autonomous machine 100 and align itself to these crop rows accordingly.

Upon reaching the georeferenced boundary of the agricultural field, the autonomous machine 100 can autonomously execute a reverse-offset maneuver to turn 180° and align itself with a second set of crop rows—offset from the first set of crop rows by an effective width of the tool housing 120 (e.g., by four crop rows for the tool housing 120 loaded with four weeding modules). For example, the autonomous machine 100 can execute a U-turn maneuver responsive to both GPS triggers and optical features indicative of the end of the crop row in images recorded by various cameras in the autonomous machine 100. The autonomous machine 100 can again: accelerate to the target ground speed parallel to the second set of crop rows; maintain the second set of crop rows centered within the width of the autonomous machine 100; and repeat the reverse-offset maneuver to align itself with a third set of crop rows upon reaching the opposing georeferenced boundary of the agricultural field. The autonomous machine 100 can repeat these processes until the autonomous machine 100 has traversed the entirety of the specified area of the agricultural field, then autonomously navigate back to a stop location, and finally enter a standby mode.

However, the autonomous machine 100 can implement any other method or technique to track its location and orientation, to autonomously navigate across an agricultural field, and to maintain itself in alignment with rows of crops during a weeding operation.

5.2 Default Weeding Module Operation

As described above, the autonomous machine 100 can maintain the blades 132 in the closed position by default in order to upset all non-target plants in the path of the blades 132 as the autonomous machine 100 navigates along a row of crops.

5.3 Plant Detection and Identification

While navigating along the row of crops in Block S110, as shown in FIG. 1, the autonomous machine 100 can regularly record images through one or more ground-facing camera 112S (e.g., RGB color or multispectral cameras) arranged in the light module 110, such as at a rate of 24 Hz, in Block S120. Upon receipt of a first entry image recorded by the ground-facing camera 112(s) at a first time, the autonomous machine 100 can implement computer vision techniques to: detect and extract features in the first entry image; and to identify these features as representing target plants, weeds, soil, or other non-target matter in Block S130. For example, the autonomous machine 100 can implement template matching, object recognition, or other plant classifier or computer vision techniques to detect plant matter in the first entry image and to distinguish a first target plant from weeds in the first entry image (e.g., based on plant color(s), leaf shape, and/or size, etc.). The autonomous machine 100 can additionally or alternatively implement deep learning techniques (e.g., convolutional neural networks) to collect these data.

Once a target plant is identified in an image from the ground-facing camera 112, the autonomous machine 100 can represent the identified target plant as a collection of pixels in the image. The autonomous machine 100 can store the collection of pixels in an array or any other data structure.

However, the autonomous machine 100 can implement any other method or technique to detect and distinguish a target plant from other features of the plant bed represented in the first entry image and to determine a position of the stalk of the plant in the first entry image.

5.4 Depth Imaging

Figure 3:
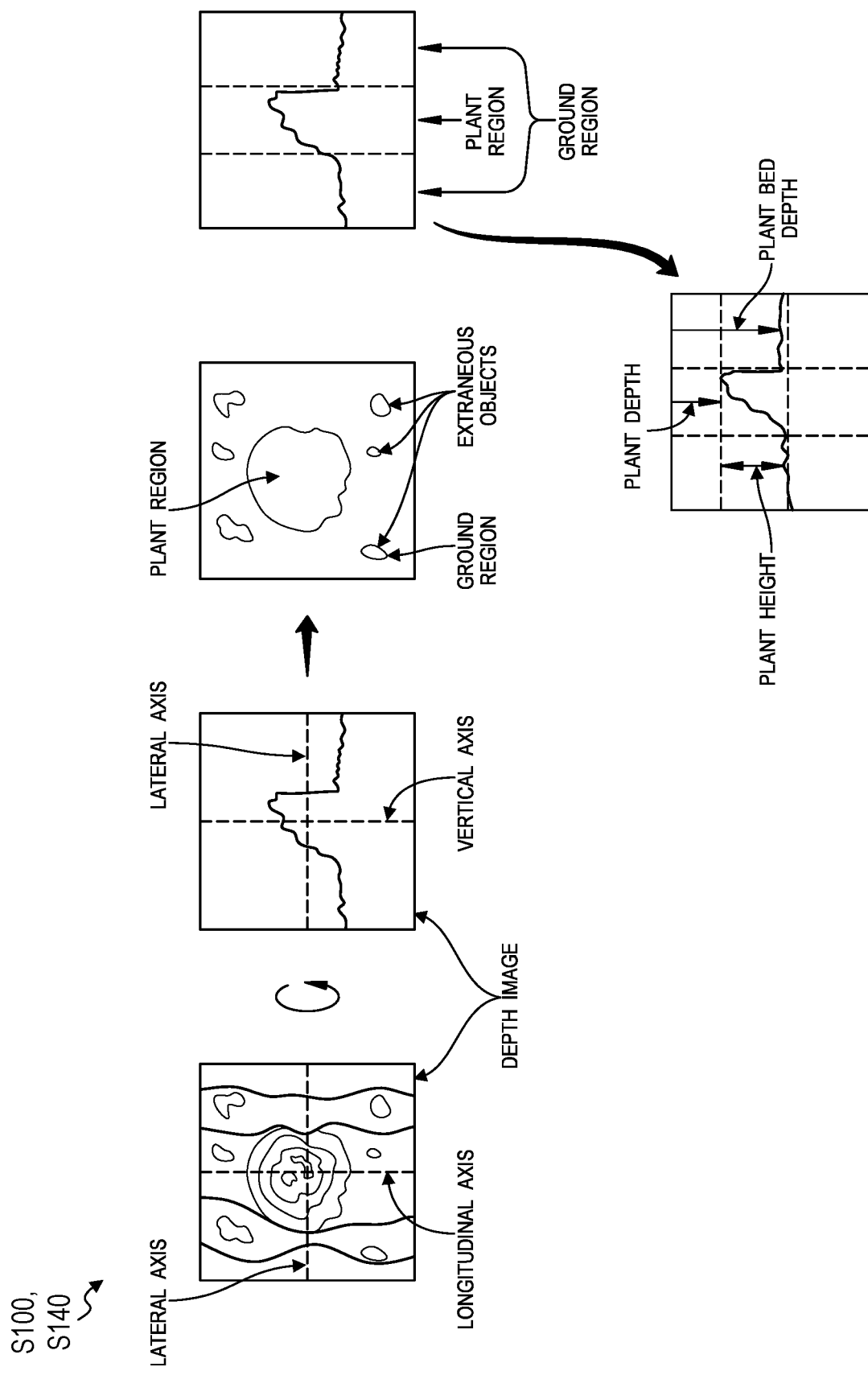
FIG. 3 is a flowchart representation of the first method.

In one variation, as shown in FIG. 3 the autonomous machine 100 can also detect a depth of subregion of the ground area of the plant bed within the light module 110 in Block S140, while concurrently recording images of target plants in Block S120. More specifically, the autonomous machine 100 can: at the depth sensor 116, record a depth image of the subregion of the ground area; identify a ground region within the depth image; and average the depth of the ground region to calculate the depth of the subregion of the ground area. By recording a depth image of a subregion of the ground area, the autonomous machine 100 can provide an accurate point of reference for the depth of the plant bed below the autonomous machine 100 and can adjust the surface profile (obtained via extension distances and lateral positions of tool modules 130 of the autonomous machine 100), which spans a longer lateral distance such that the absolute depth of a corresponding region of the surface profile matches the depth of the plant bed measured by the depth sensor 116. Thus, by incorporating depth information from both the depth sensor 116 and the tool modules 130, the autonomous machine 100 can obtain an accurate and wide depth profile for the plant bed and achieve accurate lateral and/or longitudinal position estimates for target plants.

In order to accurately identify the depth of the plant bed surface from a depth image, the autonomous machine 100 can identify regions of the depth image occupied by plants or other objects and exclude these regions from the calculation of the average depth of the plant bed (i.e. identifying a ground region of the depth image). In one implementation, the autonomous machine 100 can identify regions of the depth image occupied by plants or other obstacles via statistical methods such as outlier detection, edge detection, classification by a neural network or other machine learning technique, etc. Alternatively, the autonomous machine 100 can perform sensor fusion by overlaying image data onto the depth image and identifying regions of the depth image that correspond to particular plants or other objects identified in images of the ground area.

The autonomous machine 100 can then remove the identified regions from the depth image and detect a depth of the ground region within the depth image. In one implementation, the autonomous machine 100 calculates a single depth value by averaging the depth of the ground region of the depth image corresponding to the plant bed. The autonomous machine 100 defines this point depth value laterally within the same coordinate system defined by the ground-facing camera 112. Alternatively, the autonomous machine 100 calculates a surface that best fits the ground region of the depth image. Therefore the autonomous machine 100 can adjust a surface profile calculated according to extension distances of the tool modules 130 of the autonomous machine 100 to match the surface or point depth detected by the depth sensor 116.

However, the depth sensor 116 can detect the depth of the plant bed in any other way.

5.4.1 Plant Height Detection

In one implementation, as shown in FIG. 3, the autonomous machine 100 can also detect the height of target plants based on depth images recorded via the depth sensor 116 of the autonomous machine 100. More specifically, the autonomous machine 100 can: identify a plant-occupying region of within the depth image; and calculate a plant height based on the plant-occupying region of the depth image.

In this implementation, the autonomous machine 100 can identify regions of a depth image corresponding to a target plant as described above (e.g., via statistical methods or via sensor fusion with images recorded by the ground-facing camera 112). The autonomous machine 100 can then analyze these regions to determine a smoothed peak height of the region, which may roughly correspond to the height of a single target plant (i.e. a plant height). The autonomous machine 100 can then record the value of this height across a number of target plants and calculate a running average or other measure of central tendency of the height of target plants within the agricultural field.

By obtaining an approximate height of target plants within the agricultural field, the autonomous machine 100 can more accurately estimate the lateral position of the base of the target plant and therefore better position tool modules 130 to perform agricultural operations on or around the target plant.

5.5 Target Plant Location Estimation

Once the autonomous machine 100 has identified a target plant in an image, the autonomous machine 100 can: identify a pixel location corresponding to a stalk location of a target plant; identify a projection in two or three-dimensional space corresponding to the pixel location; estimate a surface profile based on extension distances of tool modules 130 of the autonomous machine 100; estimate a depth profile based on the surface profile; and calculate a location of the target plant based on the depth profile, the projection corresponding to the pixel location of the target plant, and/or the plant height of target plants.

5.5.1 Pixel Location Identification

Once the autonomous machine 100 identifies a target plant in the first entry image, the autonomous machine 100 can extract the pixel location of the first target plant in first entry image in Block S132; and map the extracted pixel location to a projection of the target plant.

The autonomous machine 100 identifies a pixel location approximating a location of a stalk of the target plant within the field of view of the camera at the time the image was recorded. For example, the autonomous machine 100 can calculate a centroid of the set of pixels identified as the target plant. Alternatively, the autonomous machine 100 can perform additional computer vision techniques to approximate the pixel location of the stem from the set of pixels identified as the target plant. The autonomous machine 100 can then extract the coordinates of the identified pixel.

5.5.2 Projection Identification

The autonomous machine 100 can then calculate a projection, corresponding to the extracted pixel coordinates. The calculated projection therefore corresponds to an estimated heading, in three-dimensional space, of the stalk of the target plant relative to the ground-facing camera 112. The autonomous machine 100 can store a mapping of each pixel location in the field of view of the camera to a projection corresponding to that pixel. Alternatively, the autonomous machine 100 can include a parametric model, which takes in pixel coordinates and outputs the projection corresponding to the pixel coordinates.

The autonomous machine 100 can store the projection corresponding to the pixel representing a target plant using any suitable mathematical description (e.g., projective coordinates, vector descriptions, linear functions, etc.). The autonomous machine 100 can also store an origin of a projection in three-dimensional space. Alternatively, the autonomous machine 100 can store only a lateral component of the projection with which to estimate a lateral position of a target plant.

5.5.3 Surface Profile Estimation

In order to estimate the location of the target plant along the projection corresponding to the pixel representing the target plant, the autonomous machine 100 can estimate the depth of the plant bed at the location of the target plant. In order to estimate the depth of the plant bed proximal the target plant, the autonomous machine 100 can first estimate a surface profile of the plant bed which defines the relative shape of the plant bed surface (as opposed to its absolute depth magnitude). Once the autonomous machine 100 has estimated the surface profile of the plant bed, the autonomous machine 100 can locate the surface profile in three-dimensional space (i.e. at a depth below the autonomous machine 100 and relative to the ground-facing camera 112), by aligning the surface profile with the depth detected by the depth sensor 116 of the autonomous machine 100. Alternatively, in implementations of the autonomous machine 100 that do not include a depth sensor 116, the autonomous machine 100 can use the surface profile as the depth profile without referencing any additional depth measurements.

The autonomous machine 100 estimates a surface profile of the plant bed surface by: recording an extension distance in Block S150 and a lateral position for each tool module 130 in Block S152 and recording a height and/or a tilt of the toolbar. Because each tool module 130 extends to contact the surface of the plant bed and is mounted to the toolbar, the autonomous machine 100 can virtually plot the depth of the plant bed surface at the lateral position of each of the tool modules 130 given the relative positions of the ground-facing camera 112, the toolbar, and each tool module 130. For example, if the autonomous machine 100 includes six tool modules 130, the autonomous machine 100 can plot six points corresponding to the depth of the plant bed surface at a given lateral position. In one implementation, the autonomous machine 100 performs a linear regression of the plotted depth points to estimate a surface profile. Alternatively, the autonomous machine 100 can utilize higher-order polynomial regression, or a linear, polynomial, or spline interpolation between each point, to estimate a surface profile in Block S160.

Thus, the autonomous machine 100 can: for each tool module 130 in the set of tool modules 130, define a contact point of the tool module 130 at an intersection of the first extension distance of the tool module 130 and the first lateral position of the tool module 130 to generate a set of contact points (i.e. in a longitudinal plane relative to the autonomous machine 100); and interpolate between the set of contact points to generate the surface profile of the plant bed (or depth profile in implementations of the autonomous machine 100 not including a depth sensor 116).

Because each tool module 130 is aligned longitudinally (i.e. in the same longitudinal plane), these surface points constitute a two-dimensional profile of the plant bed surface at the longitudinal position of the tool modules 130. However, because plant bed surfaces are relatively consistent in the longitudinal direction, the autonomous machine 100 can propagate forward the two-dimensional surface profile at the location of the tool modules 130 to estimate the surface profile of the plant bed surface along the projections of pixels representing the target plant. The autonomous machine 100 can virtually plot an extended three-dimensional surface against the projection corresponding to the pixel representing the target plant. The autonomous machine 100 can then estimate a location of the target plant based on the intersection in three-dimensional space of the estimated plant bed surface and the projection corresponding to the target plant in Block S180. Once an intersection between the estimated plant bed surface and the projection of the target plant is calculated, the autonomous machine 100 can extract a lateral coordinate and/or a longitudinal coordinate of the intersection point.

In one implementation, the autonomous machine 100 can calculate an average surface profile (or depth profile, depending on the implementation) based on the extension distances and lateral locations of the tool modules 130 over successive samples as the autonomous machine 100 navigates along a crop row in an agricultural field. This autonomous machine 100 can associate this average depth profile with a particular crop row and reset the depth profile upon navigating to a new crop row. Therefore, the autonomous machine 100 can: record a second image of a second ground area at the ground-facing camera 112, the second ground area located within the first crop row; detect a second target plant in the second image; access a lateral pixel location of the second target plant in the second image; and for each tool module 130 in the set of tool modules 130, record a second extension distance of the tool module 130 and a second lateral position of the tool module 130 relative to the ground-facing camera 112. The autonomous machine 100 can then: estimate a second depth profile of the plant bed surface proximal the target plant based on the second extension distance of each tool module 130 in the set of tool modules 130 and the second lateral position of each tool module 130 in the set of tool modules 130; estimate an average depth profile based on the first depth profile and the second depth profile, the average depth profile associated with the first crop row; estimate a real lateral location of the second target plant relative to the autonomous machine 100 based on the lateral pixel location of the second target plant and the average depth profile; drive the first tool module 130 in the set of tool modules 130 to a lateral position laterally aligned with the real lateral location of the second target plant; and, in response to lateral alignment of the lateral position of the first tool module 130 and the real lateral location of the second target plant and in response to longitudinal alignment of a longitudinal position of the tool module 130 and a real longitudinal location of the second target plant, trigger the first tool module to execute an agricultural operation on the second target plant.

5.5.4 Depth Profile Estimation

Figure 4:
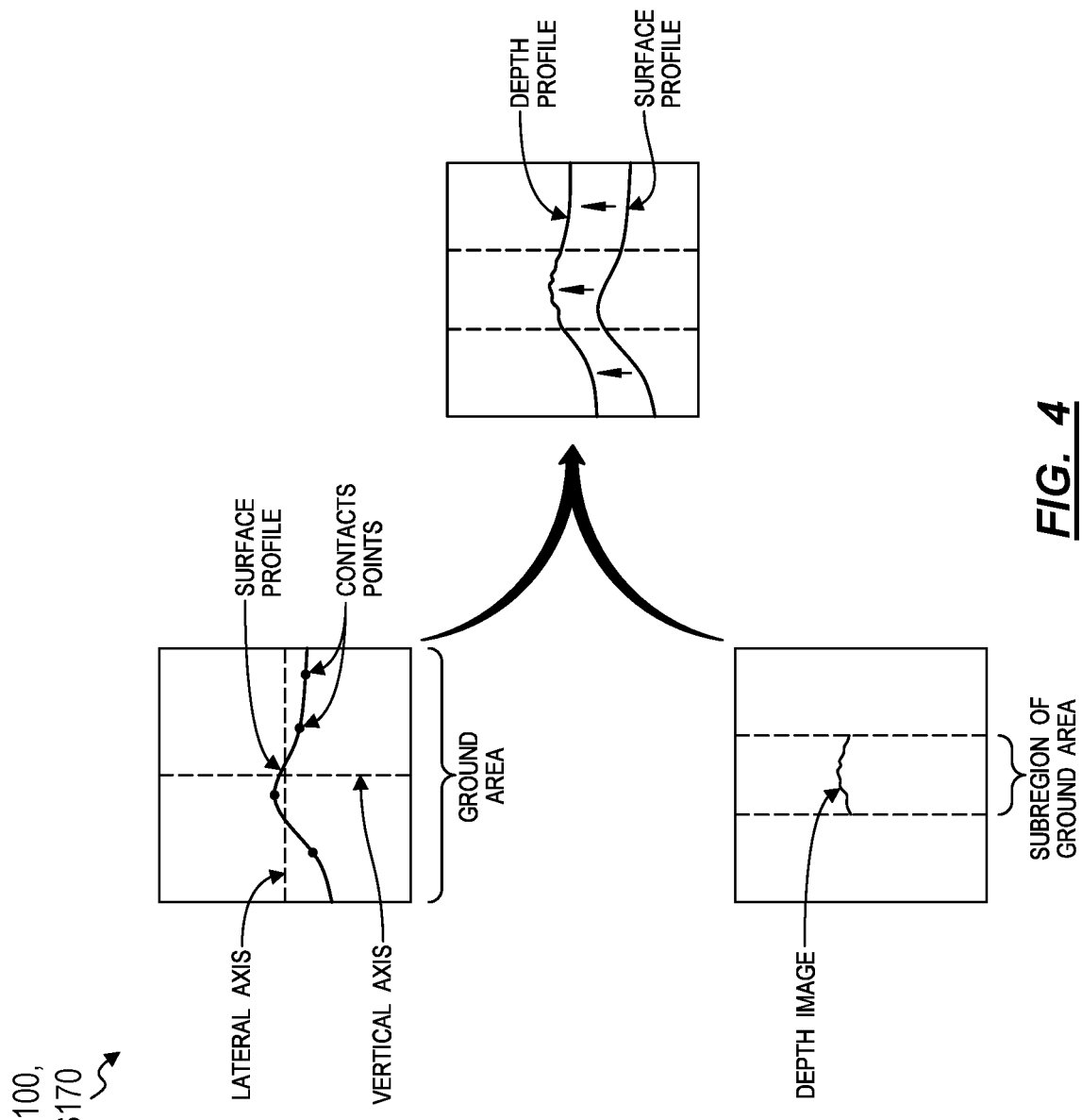
FIG. 4 is a flowchart representation of the first method.

As shown in FIG. 4, the autonomous machine 100 can calculate a depth profile based on the surface profile and the depth of the subregion of the ground area in Block S170. More specifically, the autonomous machine 100 can: identify a coincident section of the surface profile laterally coincident with the subregion of the ground area; and define the depth profile as a shifted version of the surface profile comprising the coincident section with an average depth equal to the depth of the subregion of the ground area.

In particular, upon estimating a surface profile based on a set of extension distances and a set of lateral locations corresponding to tool modules 130, the autonomous machine 100 can virtually shift this surface profile to a more accurate depth relative to the autonomous machine 100 by virtually aligning the surface profile with a depth reading or depth detected via the depth sensor 116. Thus, in some implementations, the autonomous machine 100 can assign a lateral position to a depth of the plant bed detected by the depth sensor 116. In one implementation, the lateral position of the depth of the plant bed is calculated as a weighted average of the pixels of the depth image included in the calculation for the depth measurement. Alternatively, the autonomous machine 100 defines location as the lateral location of the depth sensor 116. In yet another alternative, the autonomous machine 100 can calculate a best fit surface in three-dimensional space based on the ground region of the depth image. This best fit surface therefore includes lateral, longitudinal, and vertical information to locate it in three-dimensional space relative to the ground-facing camera 112.

Therefore, the autonomous machine 100 can virtually shift the surface profile to align with the depth information provided by the depth sensor 116. In implementations wherein the autonomous machine 100 calculates a single depth value representing the depth of the plant bed, the autonomous machine 100 matches a lateral location of the surface profile with a lateral location of the depth value and sets the depth of the surface profile to equal the measured depth value at the lateral location. Alternatively, the autonomous machine 100 can shift the surface profile to minimize differences between the surface profile and a best fit surface calculated by the autonomous machine 100.

5.5.5 Location Calculation

In Block S180, the autonomous machine 100 calculates the lateral position of the plant by extracting the lateral coordinate of an intersection between the depth profile of the plant bed surface and a lateral component of the projection corresponding to the pixel representing the target plant, thereby estimating the location of the target plant in only two dimensions (vertical and lateral). This two-dimensional approach reduces processing time when compared to the aforementioned three-dimensional approach. In this implementation, the autonomous machine 100 can estimate the longitudinal position of the target plant based on the image without the depth profile. Alternatively, the autonomous machine 100 can project forward the two-dimensional depth profile to generate a three-dimensional depth profile and calculate an intersection of the projection and the depth profile in three-dimensional space, thereby estimating both a real lateral and a real longitudinal location of the target plant.

In yet another alternative implementation, the autonomous machine 100 can: access the target plant height detected via the depth sensor 116 and subtract the target plant height from the depth profile to create a modified depth profile. Thus, the modified depth profile represents the locations of tops of target plants, which are typically the part of a target plant visible in images recorded by the autonomous machine 100 (and therefore an accurate point of the target plant from which to determine a location of the target plant).

Thus, the autonomous machine 100 can: access a ray (i.e. a projection) in three-dimensional space relative to the ground-facing camera 112 corresponding to the lateral pixel location of the first target plant; subtract the plant height from the depth profile to calculate an approximate depth of the first target plant; and estimate the real lateral location along the ray, the real lateral location corresponding to the approximate depth of the first target plant.

In one implementation, the autonomous machine 100 can record successive images of the plant bed while the target plant passes underneath the light module 110, thereby continuously updating the projection corresponding to the pixel representing the target plant. Additionally, in this implementation, the autonomous machine 100 can update the depth profile by recording concurrent extension distances from the tool modules 130. As the target plant approaches the tool modules 130, the estimation of the depth profile of the plant bed surface at the target plant may improve because the target plant is closer to the tool modules 130. In one implementation, the autonomous machine 100 can continue to update the depth profile and re-estimate the location of the target plant even when the plant has left the field of view of the ground-facing camera 112 and is located between the light module no and the tool modules 130. Therefore, the autonomous machine 100 can continue updating the location of the target plant with additional accuracy until the tool modules 130 reach the target plant. Concurrent with each update to the target plant's location, the autonomous machine 100 can drive the corresponding tool module 130 to laterally align with each updated location. Thus, as the location estimate of the target plant improves, the lateral offset between the end effector and the location of the target plant typically decreases.

In one implementation, the autonomous machine 100 can simultaneously track the location of multiple target plants in several crop rows (e.g. four or six), utilizing the method described above to estimate the location of each target plant. In one implementation, the autonomous machine 100 stores the estimated location of each target plant in a matrix, while also storing a representation of a projection corresponding to the pixel representing the target plant in association with the estimated location. The autonomous machine 100 can represent the location of a target plant in any suitable coordinate system (e.g. cartesian, spherical, cylindrical). The autonomous machine 100 can utilize image tracking techniques to track each target plant between successive images and update the location estimate corresponding to each target plant accordingly.

Therefore, the autonomous machine 100 can update the location of each target plant represented in the location matrix based on the most recently recorded plant bed surface data from the tool modules 130 and the stored projection corresponding to each pixel representing each target plant. Thus, even when a target plant is out of view of the ground-facing camera 112, the autonomous machine 100 can use the last recorded projection corresponding to the last pixel representing the target plant to estimate the real location of the target plant. Therefore, the autonomous machine 100 can record an image at a first time, and calculate a location of the target plant at a second time, wherein the second time is delayed from the first time based on a longitudinal location of the ground-facing camera 112 relative to a longitudinal location of the first tool module 130 and a speed of the autonomous machine 100. More specifically, the autonomous machine 100 can: estimate an intermediate depth profile of the plant bed surface at the longitudinal location of the set of tool modules 130; and project the intermediate depth profile to the longitudinal location of the first target plant to estimate the first depth profile.

Thus, the autonomous machine 100 can continue to recalculate the lateral location of the target plant until the tool modules 130 longitudinally align with the target plant. Alternatively, the autonomous machine 100 can concurrently calculate a location of the target plant immediately succeeding identifying the target plant and forgo additional estimation based on updated depth profiles as the autonomous machine traverses the plant bed. Thus, in one implementation, the aforementioned second time can immediately succeed the first time. More specifically, the autonomous machine can: estimate an intermediate depth profile of the plant bed surface at the longitudinal location of the set of tool modules; and project the intermediate depth profile forward proximal the target plant to estimate the first depth profile.

In one implementation, the autonomous machine 100 can extract a lateral pixel location of the target plant such that the projection is represented by an angle relative to the ground-facing camera 112, as opposed to a two-dimensional representation of a projection in three-dimensional space. In one implementation, the autonomous machine 100 extracts the lateral pixel location when the target plant is substantially longitudinally aligned with the ground-facing camera 112, based on the longitudinal pixel location of the target plant.

However, the autonomous machine 100 can implement any other method for estimating a lateral and/or longitudinal location of the target plant utilizing depth measurement from tool modules 130.

6. Target Plant Tracking

Once the location coordinates (or lateral location coordinate) of the target plant have been estimated, the autonomous machine 100 can laterally align an end effector of a tool module 130 to perform an agricultural function, such as weeding at or immediately around the target plant, as described below. The autonomous machine 100 tracks the location of the target plant in three-dimensional space based on the speed and direction of the autonomous machine 100, such that the end effector can be laterally aligned at the time the tool module 130 reaches the target plant.

The autonomous machine 100 tracks the location of the target plant in two-dimensional space (or three-dimensional space) relative to the autonomous machine 100 based on changes in the global position and orientation of the autonomous machine 100, such that the autonomous machine 100 can: laterally align an end effector of a tool module 130 with the target plant at the time the tool module 130 reaches the target plant; track the longitudinal location of the target plant; and detect longitudinal alignment between the blades 132 of the weeding module 130 and the opening location corresponding to the target plant.

The autonomous machine 100 can recalculate the location of each target plant or other relevant location relative to the autonomous machine 100 periodically (e.g., 30 times a second) based on the last or most accurately calculated location for the target plant (e.g., from amongst a number of images). Each instance in which the autonomous machine 100 recalculates the relative locations is hereinafter referred to as a "frame." After calculating the various tracked locations related to target plants, the autonomous machine tracks its change in global position and/or its change in global orientation since the most recent frame. The autonomous machine 100 can then apply spatial transformations (e.g., rotations and/or translations) to the coordinates defining the tracked locations and generate a new set of locations based on the result of the spatial transformations. In this manner, the autonomous machine 100 repeatedly updates the tracked locations relative to the autonomous machine 100.

In one implementation, the autonomous machine 100 can simultaneously track the location of multiple target plants in several crop rows (e.g. four or six), utilizing the method described above to estimate the location of each target plant. In one implementation, the autonomous machine 100 stores the estimated location of each target plant in a matrix. The autonomous machine 100 can represent the location of a target plant in any suitable coordinate system (e.g. cartesian, spherical, cylindrical). The autonomous machine 100 can utilize image tracking techniques to track each target plant between successive images and update the location estimate corresponding to each target plant accordingly.

In one implementation, the autonomous machine 100 can record successive images of the plant bed while autonomously navigating such that the target plant passes underneath the light module 110, thereby continuously updating the pixel projection corresponding to the pixel representing the target plant. Therefore, the autonomous machine 100 can continue updating the location of the target plant until the tool modules 130 reach the target plant. Concurrent with each update to the target plant's location, the autonomous machine 100 can actuate the corresponding tool module 130 to laterally align with each updated location as further described below.

Therefore, the autonomous machine 100 can update the location of each target plant represented in the location matrix based on the most recently recorded image of each target plant. Thus, even when a target plant is out of view of the front camera 112, the autonomous machine 100 can use the last location of the target plant to track the target plant.

By updating the location of each target plant represented in the location matrix or via any other two- or three-dimensional tracking method, the autonomous machine 100 can: access a longitudinal pixel location of the first target plant in the first image; calculate a real longitudinal location of the first target plant relative to the ground-facing camera 112 based on the longitudinal pixel location of the first target plant and the depth profile; track the real longitudinal location of the first target plant relative to a longitudinal location of the first tool module 130 while autonomously navigating within the agricultural field; and, in response to detecting alignment between the real longitudinal location of the first target plant and the longitudinal location of the first tool module 130, execute a weeding operation proximal the first target plant.

7. Weeding Module Positioning

After the autonomous machine 100 calculates a location of a target plant based on an entry image, the autonomous machine 100 tracks the location of the target plant relative to the autonomous machine 100, as described above. Thus, the autonomous machine 100 can drive a first weeding module 130 to laterally align the reference position of the first weeding module 130 with the first opening location, the first weeding module 130 arranged in a tool housing 120 behind the light module no in Block S190. More specifically, the autonomous machine 100 can execute closed loop controls to match a lateral coordinate of the reference position of the end effector of the tool module 130 to the most recent tracked lateral location of the target plant or opening location by laterally actuating the weeding module 130 within the tool housing 120. In this manner, the autonomous machine 100 can continuously actuate the weeding module 130 within the tool module 130 from when the autonomous machine 100 initially detects a target plant until a time at which an opening location for the target plant is longitudinally aligned with the weeding module 130.

When tracking multiple successive target plants within the same crop row, the autonomous machine 100 can laterally align with the target plant immediately in front of the tool module 130 until the tool module 130 has performed an agricultural operation on or around the target plant. Once the autonomous machine 100 executes the agricultural operation, the autonomous machine 100 can actuate the weeding module 130 to laterally align with the next plant in the crop row.

Thus, the autonomous machine 100 can: autonomously navigate along a first crop row comprising the first ground area; and, in response to lateral alignment of the lateral position of the first tool module 130 and the real lateral location of the first target plant and longitudinal alignment of a longitudinal position of the first tool module 130 and a real longitudinal location of the first target plant, execute an agricultural operation on the first target plant.

Additionally, when tracking multiple target plants, the autonomous machine 100 can: detect a second target plant in the first image; access a lateral pixel location of the second target plant in the first image; autonomous machine 100 based on the lateral pixel location of the second target plant and the first depth profile; and actuate a second tool module 130 in the set of tool modules 130 to a lateral position laterally aligned with the real lateral location of the second target plant.

8. Weeding Blade Depth Control

In one implementation, in implementations of the autonomous machine including a weeding module, the autonomous machine can utilize differences in depth measurements originating from the depth sensor 116 and the weeding module to calculate a depth of the blades 132 of the weeding modules. Due to variability in soil quality and other factors, blades 132 of the weeding module can sink into the soil at various depths even when the same amount of downward force is applied to the weeding module (e.g., via an active suspension system 134). The autonomous machine can capture the magnitude of this sinking effect by measuring the extension distance of the weeding module and calculating a difference between the extension distance and the depth value recorded by the depth sensor 116 proximal to the lateral location of the tool module 130. The autonomous machine 100 can then identify this difference as the depth of the blades 132 of the weeding module and implement closed loop controls to maintain a specific blade depth beneath the plant bed (e.g., via an active suspension system 134).

Thus, the autonomous machine 100 can: record an extension distance of a first weeding module in the set of tool modules 130; and estimate a first depth of blades 132 of the first weeding module based on a difference between the depth of the subregion of the ground area and the extension distance of the first weeding module.

Additionally, the autonomous machine 100 can: receive and input from a user specifying a set depth for the blades 132 of the first weeding module; and actuate a suspension of the first weeding module according to feedback control based on the first depth of the blades 132 of the first weeding module and the set depth of the blades 132 of the first weeding module.

In one implementation, the autonomous machine 100 can automatically estimate the maturity of an identified target plant according to machine learning techniques. The autonomous machine 100 can access (e.g., via a lookup table) a blade depth appropriate for the plant at the estimated maturity. The autonomous machine 100 can then adjust the blade depth of the weeding modules in real-time based on the estimated maturity of the target plants. Thus, the autonomous machine 100 can: estimate a maturity of the first target plant based on the first image; and modify the set depth for the blades 132 of the first weeding module based on the maturity of the first target plant.

9. Depth Sensor 116 Error Detection

In one implementation, the autonomous machine 100 can utilize the difference in depth between a depth value measured at the depth sensor 116 and the depth according to a surface profile in order to identify erroneous depth sensor 116 readings and, instead of adjusting the surface profile according to the depth value, utilize the surface profile as the depth profile. In this implementation, the autonomous machine 100 can compare the difference in depth measurements to a threshold difference, which may correspond to a maximum realistic difference limited, for example, by the suspension of the tool module 130, or any other physical or environmental constraint. Upon detecting that the difference in depth measurements has exceeded this threshold, the autonomous machine 100 can identify a malfunction of the depth sensor 116 and utilize an alternative form of depth measurement (e.g., by utilizing the extension distances of the tool modules 130 exclusively).

Thus, the autonomous machine 100 can, in response to the difference between the depth of the subregion of the ground area and the extension distance of the first weeding module exceeding a threshold difference: identify malfunction of the depth sensor 116; estimate a second depth profile of the plant bed surface proximal the first target plant based on the first extension distance of each tool module 130 in the set of tool modules 130 and the first lateral position of each tool module 130 in the set of tool modules 130; and update the real lateral location of the first target plant relative to the ground-facing camera 112 based on the lateral pixel location of the first target plant and the second depth profile.

10. Toolbar Adjustment

In one variation, the autonomous machine 100 can adjust the height and/or tilt of the toolbar based on an estimated surface profile of the plant bed surface generated by the aforementioned method S100. Generally, the autonomous machine 100 adjusts the height and/or tilt of the toolbar to maintain contact between the tool modules 130 and the plant bed surface as the autonomous machine 100 draws the tool modules 130 along the plant bed. The autonomous machine 100 can record the extension distances relative to a "home" position of the suspension system 134 of each tool module 130. The home position of the suspension system 134 can correspond to the middle of the tool module's range of vertical motion relative to the toolbar or any other preferable point within the range of motion of the tool module 130. In one implementation, the autonomous machine 100 adjusts the height of the toolbar according to the average extension distance of the set of tool modules 130 mounted to the toolbar. For example, if the average extension distance is two inches beyond the home position, then the autonomous machine 100 can lower the toolbar two inches, such that the average extension distance of the set of tool modules 130 is closer to the home position of the set of tool modules 130.

The autonomous machine 100 can also adjust the tilt of the toolbar to match the tilt of the plant bed surface below. For example, if, based on the extension distances measured from the set of tool modules 130, the plant bed is determined to have a tilt of two degrees, then the autonomous machine 100 can adjust the tilt of the toolbar to two degrees. The autonomous machine 100 can determine the tilt of the plant bed surface by plotting each extension distance versus the lateral position of the tool module 130 from which the extension distance was measured and performing a linear regression. The slope of the resulting linear fit can then be set as the tilt for the toolbar (if the value is within the toolbar's range of motion).

Therefore, the autonomous machine 100 can: actuate the toolbar from the first inclination of the toolbar to a second inclination of the toolbar, the second inclination substantially matching an average inclination of the surface profile within a range of motion of the toolbar; and actuate the toolbar from the first height of the toolbar to a second height of the toolbar, the second height minimizing, for the set of tool modules 130, a difference between an extension distance of each tool module 130 at the second height and a middle of a range of extension of each tool module 130.

However, the autonomous machine 100 can actuate the toolbar in any other way in response to extension distances recorded at the set of tool modules 130.

11. Other Operations

The autonomous machine 100 can implement similar methods and techniques to set timers for actuating tool modules 130 of other types, to set lateral positions of these tool modules 130 for passing target plants, and to thus control actuation of these tool modules 130 in order to selectively address target plants and non-target plants (e.g., weeds) in an agricultural field. For example, the autonomous machine 100 can implement the foregoing methods and techniques to: set a lateral offset for a watering module in the tool housing 120 to align a watering head in the watering module to a next target plant in a crop row; set an activation timer for dispensing water from the watering module directly onto or in the immediate vicinity of the next target plant; and set a deactivation timer for ceasing dispensation of water from the watering module once the target plant passes the watering module. In a similar example, the autonomous machine 100 can implement the foregoing methods and techniques to: set a lateral offset for a fertilizer module in the tool housing 120 to align a spray head in the fertilizer module to a next target plant in a crop row; set an activation timer for dispensing fertilizer from the fertilizer module directly onto or in the immediate vicinity of the next target plant; and set a deactivation timer for ceasing dispensation of fertilizer from the fertilizer module once the target plant passes the fertilizer module.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method comprising, at an autonomous machine:
    capturing a first image of a ground area of a plant bed surface via a ground-facing camera arranged on the autonomous machine;
    detecting a first target plant in the first image;
    accessing a lateral pixel location of the first target plant in the first image;
    via a depth sensor arranged on the autonomous machine, estimating a depth of a subregion of the ground area;
    for each tool module in a set of tool modules in contact with the plant bed surface and arranged behind the ground-facing camera relative to a direction of forward motion of the autonomous machine:
        capturing an extension distance of the tool module; and
        capturing a lateral position of the tool module relative to the ground-facing camera;
    estimating a surface profile of the plant bed surface based on the extension distance of each tool module in the set of tool modules and the lateral position of each tool module in the set of tool modules;
    estimating a depth profile based on the surface profile and the depth of the subregion of the ground area, comprising:
        identifying a coincident section of the surface profile laterally coincident with the subregion of the ground area; and
        defining the depth profile as a shifted version of the surface profile comprising the coincident section with an average depth equal to the depth of the subregion of the ground area;
    estimating a real lateral location of the first target plant relative to the autonomous machine based on the lateral pixel location of the first target plant and the depth profile of the plant bed surface; and
    driving a first tool module in the set of tool modules to a lateral position laterally aligned with the real lateral location of the first target plant.

2. The method of claim 1, wherein detecting the depth of the subregion of the ground area comprises:
    at the depth sensor, capturing a depth image of the subregion of the ground area;
    identifying a ground region of the depth image; and
    calculating an average depth of the ground region based on the ground region of the depth image.

3. The method of claim 2, further comprising:
    identifying a plant-occupying region of the depth image; and
    calculating a plant height based on the plant-occupying region of the depth image.

4. The method of claim 3, wherein estimating the real lateral location of the first target plant relative to the ground-facing camera comprises:
    accessing a projection in three-dimensional space relative to the ground-facing camera corresponding to the lateral pixel location of the first target plant;
    subtracting the plant height from the depth profile to calculate an approximate depth of the first target plant; and
    estimating the real lateral location along the projection, the real lateral location corresponding to the approximate depth of the first target plant.

5. The method of claim 1, further comprising:
    at the second time, capturing an extension distance of a first weeding module in the set of tool modules; and
    estimating a first depth of blades of the first weeding module based on a difference between the depth of the subregion of the ground area and the extension distance of the first weeding module.

6. The method of claim 5, further comprising:
    receiving a set depth for the blades of the first weeding module; and
    actuating a suspension of the first weeding module according to feedback control based on the first depth of the blades of the first weeding module and the set depth of the blades of the first weeding module.

7. The method of claim 6, further comprising:
estimating a maturity of the first target plant based on the first image; and
modifying the set depth for the blades of the first weeding module based on the maturity of the first target plant.

8. The method of claim 5, further comprising:
in response to the difference between the depth of the subregion of the ground area and the extension distance of the first weeding module exceeding a threshold difference:
identifying malfunction of the depth sensor;
estimating a second depth profile of the plant bed surface proximal the first target plant based on the first extension distance of each tool module in the set of tool modules and the first lateral position of each tool module in the set of tool modules; and
updating the real lateral location of the first target plant relative to the ground-facing camera based on the lateral pixel location of the first target plant and the second depth profile.

9. The method of claim 8, wherein estimating the second depth profile comprises:
for each tool module in the set of tool modules, defining a contact point of the tool module at an intersection of the first extension distance of the tool module and the first lateral position of the tool module to generate a set of contact points; and
interpolating between the set of contact points to generate the second depth profile.

10. A method comprising, at an autonomous machine:
capturing a first image of a ground area of a plant bed surface via a ground-facing camera arranged on the autonomous machine;
detecting a first target plant in the first image;
accessing a lateral pixel location of the first target plant in the first image;
via a depth sensor arranged on the autonomous machine, estimating a depth of a subregion of the ground area, comprising:
at the depth sensor, capturing a depth image of the subregion of the ground area;
identifying a ground region of the depth image; and
calculating an average depth of the ground region based on the ground region of the depth image;
for each tool module in a set of tool modules in contact with the plant bed surface and arranged behind the ground-facing camera relative to a direction of forward motion of the autonomous machine:
capturing an extension distance of the tool module; and
capturing a lateral position of the tool module relative to the ground-facing camera;
estimating a surface profile of the plant bed surface based on the extension distance of each tool module in the set of tool modules and the lateral position of each tool module in the set of tool modules;
estimating a depth profile based on the surface profile and the depth of the subregion of the ground area;
estimating a real lateral location of the first target plant relative to the autonomous machine based on the lateral pixel location of the first target plant and the depth profile of the plant bed surface; and
driving a first tool module in the set of tool modules to a lateral position laterally aligned with the real lateral location of the first target plant.

11. The method of claim 10, further comprising:
identifying a plant-occupying region of the depth image; and
calculating a plant height based on the plant-occupying region of the depth image.

12. The method of claim 11, wherein estimating the real lateral location of the first target plant relative to the ground-facing camera comprises:
accessing a projection in three-dimensional space relative to the ground-facing camera corresponding to the lateral pixel location of the first target plant;
subtracting the plant height from the depth profile to calculate an approximate depth of the first target plant; and
estimating the real lateral location along the projection, the real lateral location corresponding to the approximate depth of the first target plant.

13. A method comprising, at an autonomous machine:
capturing a first image of a ground area of a plant bed surface via a ground-facing camera arranged on the autonomous machine;
detecting a first target plant in the first image;
accessing a lateral pixel location of the first target plant in the first image;
via a depth sensor arranged on the autonomous machine, estimating a depth of a subregion of the ground area;
for each tool module in a set of tool modules in contact with the plant bed surface and arranged behind the ground-facing camera relative to a direction of forward motion of the autonomous machine:
capturing an extension distance of the tool module; and
capturing a lateral position of the tool module relative to the ground-facing camera;
estimating a surface profile of the plant bed surface based on the extension distance of each tool module in the set of tool modules and the lateral position of each tool module in the set of tool modules;
estimating a depth profile based on the surface profile and the depth of the subregion of the ground area;
estimating a real lateral location of the first target plant relative to the autonomous machine based on the lateral pixel location of the first target plant and the depth profile of the plant bed surface; and
driving a first tool module in the set of tool modules to a lateral position laterally aligned with the real lateral location of the first target plant;
at a second time, capturing an extension distance of a first weeding module in the set of tool modules; and
estimating a first depth of blades of the first weeding module based on a difference between the depth of the subregion of the ground area and the extension distance of the first weeding module.

14. The method of claim 13, further comprising:
receiving a set depth for the blades of the first weeding module; and
actuating a suspension of the first weeding module according to feedback control based on the first depth of the blades of the first weeding module and the set depth of the blades of the first weeding module.

15. The method of claim 14, further comprising:
estimating a maturity of the first target plant based on the first image; and
modifying the set depth for the blades of the first weeding module based on the maturity of the first target plant.

16. The method of claim 13, further comprising:
in response to the difference between the depth of the subregion of the ground area and the extension distance of the first weeding module exceeding a threshold difference:
identifying malfunction of the depth sensor;
estimating a second depth profile of the plant bed surface proximal the first target plant based on the first extension distance of each tool module in the set of tool modules and the first lateral position of each tool module in the set of tool modules; and
updating the real lateral location of the first target plant relative to the ground-facing camera based on the lateral pixel location of the first target plant and the second depth profile.

17. The method of claim 16, wherein estimating the second depth profile comprises:
for each tool module in the set of tool modules, defining a contact point of the tool module at an intersection of the first extension distance of the tool module and the first lateral position of the tool module to generate a set of contact points; and
interpolating between the set of contact points to generate the second depth profile.

* * * * *